June 14, 1960

F. O. SEGER 2,940,799

FLUID PRESSURE BRAKE APPARATUS EMBODYING
IMPROVED BRAKE CONTROLLING VALVE

Filed Jan. 29, 1958

INVENTOR.
Fritz O. Seger
BY
Adelbert A. Steinmiller
Attorney

United States Patent Office 2,940,799
Patented June 14, 1960

2,940,799

FLUID PRESSURE BRAKE APPARATUS EMBODYING IMPROVED BRAKE CONTROLLING VALVE

Fritz O. Seger, East McKeesport, Pa., assignor to Westinghouse Air Brake Company, Wilmerding, Pa., a corporation of Pennsylvania Filed Jan. 29, 1958, Ser. No. 711,839

19 Claims. (Cl. 303—35)

This invention relates to fluid pressure brake apparatus and more particularly to such apparatus embodying an improved brake controlling valve of the type operative to provide graduated release of brakes in a plurality of steps or stages or effect a direct release of brakes according to whether pressure of fluid in a brake pipe is increased a slight degree or is increased a greater degree following a brake application.

According to the present invention, there is provided an improved brake controlling valve comprising a service valve controlled by pressure of fluid in a control reservoir (normally containing fluid at substantially the normal charge value of brake pipe pressure) acting in opposition to pressure of fluid in an expansion reservoir and to pressure of fluid in a brake cylinder and operative to provide in the brake cylinder fluid at a pressure substantially proportionate to the magnitude of the differential between control reservoir pressure and expansion reservoir pressure. Upon a reduction in brake pipe pressure, the service valve will operate to supply fluid under pressure from a supply reservoir to the brake cylinder at a very rapid rate until a normally open preferably unrestricted flow connection between the brake pipe and expansion reservoir is closed by an inshot valve responsively to a brake cylinder pressure in excess of a preselected value; whereupon further supply of fluid under pressure to the brake cylinder will be at the restricted rate corresponding to the rate at which expansion reservoir pressure blows down into the brake pipe via a restricted one-way flow communication bypassing said inshot valve.

One valve device is preferably provided which responds to a slight increase in brake pipe pressure over expansion reservoir pressure to initially backdump fluid at a substantially unrestricted rate from the supply reservoir into the brake pipe until the resultant local increase in brake pipe pressure causes said valve device to operate to permit continued flow from the supply reservoir to the brake pipe at a very substantially restricted rate, said valve device thus operating on each car to locally reinforce a pressure increase wave in the brake pipe and thus hasten initiation of a release of brakes through a long train. Another valve device is preferably provided which responds to an increase in brake pipe pressure over expansion reservoir pressure to backdump fluid under pressure from the control reservoir into the expansion reservoir at a restricted rate (considerably greater than said very substantially restricted rate) until expansion reservoir pressure increases to substantially the existing value of brake pipe pressure for so influencing operation of said service valve as to cause a desired step of reduction of brake cylinder pressure when brake pipe pressure is increased a small degree at the locomotive and the brake pipe is then lapped at the locomotive.

If, however, instead of lapping the brake pipe at the locomotive after brake pipe pressure has been increased a small degree, brake pipe pressure is permitted to increase uninterruptedly, brake cylinder pressure will be directly and completely released; it being noted that because of such backdump, such complete release of brake cylinder pressure can be accomplished without requiring brake pipe pressure to be restored to substantially its normal charge value.

After expansion reservoir pressure has thus increased by operation of said other valve device to substantially the existing value of brake pipe pressure, said one valve device (if used) will operate to completely cut off flow from the supply reservoir to the brake pipe. Said one valve device is also preferably adapted to respond to a reduction in brake pipe pressure in excess of a predetermined degree below expansion reservoir pressure to open an emergency vent valve and thereby locally release fluid under pressure from the brake pipe to atmosphere at a very rapid rate; said predetermined degree being exceeded only when brake pipe pressure is reduced at an emergency rate.

The control reservoir is preferably charged from the expansion reservoir via a poppet-type valve, which is part of said other valve device, and charging choke means. Also, it is preferable that a check valve be provided to permit fluid flow only from the brake pipe to a chamber and that valve means be provided to open said chamber to the supply reservoir only when control reservoir pressure exceeds supply reservoir pressure, so that irrespective of the volume of supply reservoir used, supply reservoir pressure can never increase at a rate exceeding the rate at which the control reservoir is charged. By controlling charging of the control reservoir and supply reservoir in the manner just described, the possibility of overcharging these reservoirs during an increase in brake pipe pressure is effectively prevented.

It is also preferable that the service valve, when in a full release position, mechanically opens a valve for venting a quick service volume and that said service valve, when in a preliminary quick service position (intermediate its full release position and a brake application position), establishes restricted connection of the expansion reservoir with the quick service volume for effecting a desired rate of local quick service reduction in expansion reservoir pressure and also in brake pipe pressure, inasmuch as the brake pipe will then be open to the expansion reservoir via the aforementioned unrestricted flow connection.

The inshot valve embodied in the improved brake controlling valve may be of a type which is closed and opened, respectively, according to whether brake cylinder pressure exceeds or is less than a preselected value; or said inshot valve may be of a novel type which is closed when brake cylinder pressure exceeds said preselected value and held closed until expansion reservoir pressure increases to within a preselected value of brake pipe pressure via a very restricted connection which is not established until after brake cylinder pressure has reduced below said preselected value. The latter type of inshot valve is preferably employed on railroads following the practice of temporarily connecting the brake pipe at the locomotive to a source (like the main reservoir) containing fluid at a pressure substantially higher than the normal charge value of brake pipe pressure and then connecting the brake pipe to a communication charged with fluid at a reduced pressure equal to said normal charge value, in order to positively safeguard against the possibility of overcharging the expansion reservoir, control reservoir and supply reservoir while the brake pipe is connected to said source.

In the accompanying drawings.

Figure 1:
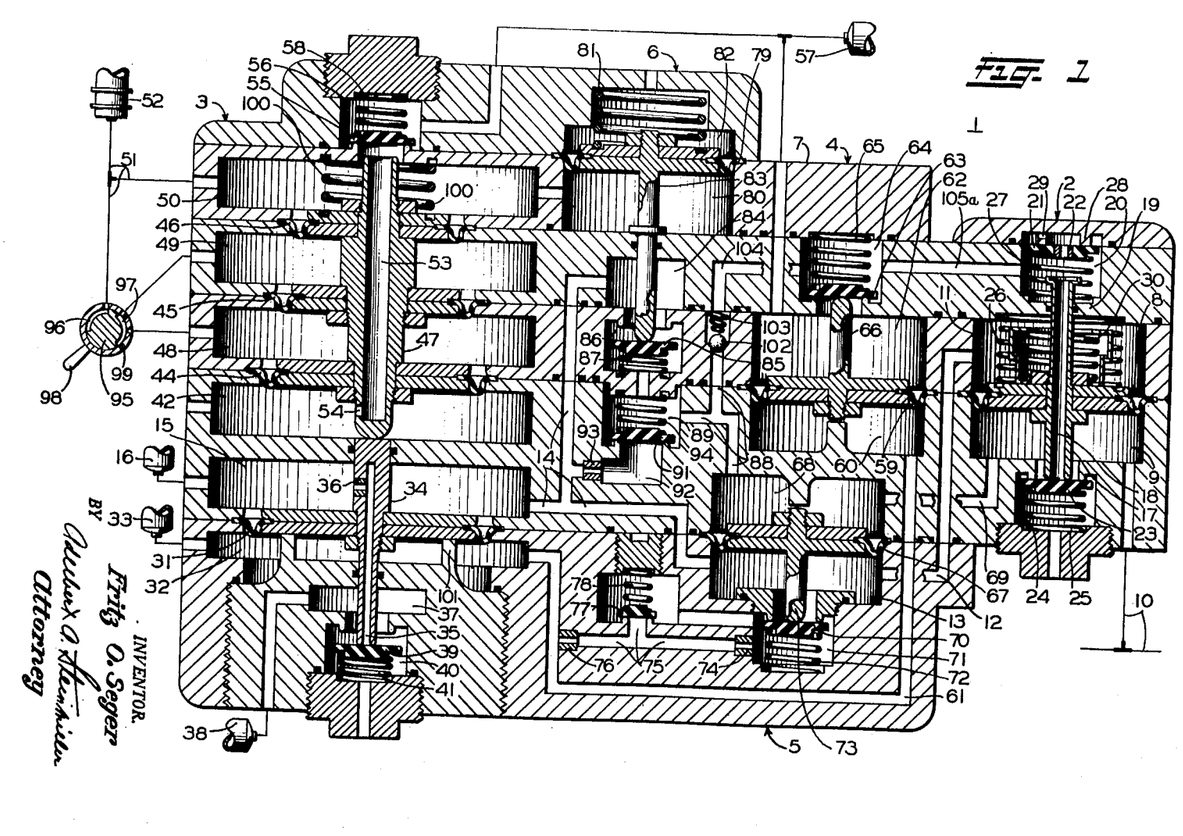
Fig. 1 is a diagrammatic view of a fluid pressure brake apparatus embodying the invention.

Description—Fig. 1

As shown in this figure, the fluid pressure brake apparatus embodying the invention comprises a brake controlling valve device 1 which, in turn, comprises a valve device 2, a service valve device 3, a supply reservoir charging valve device 4, a valve device 5, and an inshot valve device 6, all of which valve devices 2, 3, 4, 5, and 6 are preferably contained within a unitary sectionalized casing 7.

The valve device 2 preferably comprises a movable abutment 8 having at its underside a chamber 9 open to a branch of a brake pipe 10 and having at its upper side a chamber 11 open via a passage 12, a chamber 13, a passage 14 and a chamber 15 to an expansion reservoir 16. Extending coaxially through and positively connected to movable abutment 8 is a tubular valve element 17 having a central through passage 18. Adjacent its upper end, valve element 17 has sealing, slidably guided contact with the wall of an aligned bore through a casing partition 19 separating chamber 11 from a chamber 20; and at its upper end, which extends into chamber 20, said valve element is adapted to sealingly abut a coaxially arranged disc-shaped valve 21 in encirclement of a choke 22 centrally disposed in said valve. At its lower end, valve element 17 is adapted to sealingly abut and to unseat a preferably disc-shaped emergency vent valve 23 contained in an atmospheric chamber 24 and normally biased by a helical spring 25 in said chamber into seating contact with an annular valve seat rib that encircles said valve element with substantial clearance.

When fluid pressures in chambers 9 and 11 are substantially equal, a helical spring 26 disposed in chamber 11 and of lighter force than spring 25 biases the movable abutment 8 and thereby valve element 17 to a normal position, in which it is shown, and in which: valve element 17 sealingly abuts but does not unseat the spring-biased vent valve 23; the upper end of said valve element is spaced from valve 21; and valve 21 is biased by a light helical spring 27 in chamber 20 into seating contact with an annular valve seat rib 28 that is formed in the end wall of chamber 20 and has at least one radial port 29 therethrough. Arranged concentrically within the spring 26 is a helical spring 30 which operatively bears against the upper side of movable abutment 8 and is suitably caged to limit the extent of its expansion in the direction of casing partition 19; the caged height of spring 30 being such as to require it to be compressed by engagement with said partition before the valve element 17 can sealingly abut valve 21, for reasons which will become apparent from subsequent description.

The service valve device 3 preferably comprises a movable abutment 31 having at its underside a chamber 32 open to a control reservoir 33 and having at its upper side the chamber 15 open to expansion reservoir 16. Extending coaxially through and positively connected to movable abutment 31 is a valve element 34, which also serves as a pusher stem and has an opening 35 extending centrally upward from its lower end and constantly open to chamber 15 via a radial port containing a quick service choke 36. Intermediate its ends, valve element 34 has sealing, slidably guided contact with the wall of an aligned bore through a casing partition separating chamber 32 from a chamber 37 that is open to a quick service volume 38. At its open lower end, valve element 34 is adapted to sealingly abut and to unseat a preferably disc-shaped quick service volume vent valve 39 that is contained in an atmospheric chamber 40 and biased by a light helical spring 41 in said chamber into seating contact with an annular valve seat rib which encircles said valve element with substantial clearance. Adjacent its enclosed upper end, valve element 34 has sealing, slidably guided contact with the wall of an aligned bore through a casing partition separating chamber 15 from an atmospheric chamber 42.

Arranged coaxially with and above movable abutment 31 are three movable abutments 44, 45, 46, of decreasing effective areas in the order recited and each positively connected to a common valve element 47 that extends centrally through said three movable abutments and at its enclosed lower end is adapted to abut the enclosed upper end of valve element 34. The movable abutments 44, 45, 46 are preferably arranged such that chamber 42 is at the lower side of movable abutment 44; a chamber 48 separates movable abutments 44, 45; a chamber 49 separates movable abutments 45, 46; and a chamber 50, constantly open via a pipe 51 to a brake cylinder 52, is at the upper side of movable abutment 46. The valve element 47 has a bore-like opening 53 which extends centrally downward from its upper end and is constantly open via a suitable radial port or ports 54 to atmospheric chamber 42. At its upper end, valve element 47 is adapted to sealingly abut and to unseat a preferably disc-shaped brake cylinder supply valve 55 that is contained in a chamber 56 open to a supply reservoir 57; said valve normally being biased by a light helical spring 58 in said chamber into seating contact with an annular valve seat rib that encircles said valve element with substantial clearance.

The supply reservoir charging valve device 4 preferably comprises a movable abutment 59 having at one side a chamber 60 constantly open to the control reservoir 33 via a passage 61 and the chamber 32 and having at the opposite side a chamber 62 constantly open to the supply reservoir 57. Arranged coaxially with movable abutment 59 is a preferably disc-shaped supply reservoir charging valve 63 which is disposed in a chamber 64 and normally held seated by a light helical bias spring 65 in said chamber. When control reservoir pressure in chamber 60 exceeds supply reservoir pressure in chamber 62, valve 63 is unseatable by a pusher stem 66 coaxially connected to said movable abutment, for permitting fluid flow from chamber 64 to chamber 62 for charging the supply reservoir 57.

The valve device 5 preferably comprises a movable abutment 67 subject opposingly to expansion reservoir pressure in chamber 13 and to brake pipe pressure as noted in a chamber 68 via a passage 69 leading to chamber 9. Arranged coaxially with movable abutment 67 is a preferably disc-shaped valve 70 which is disposed in a chamber 71 and normally held seated by a helical bias spring 72 in said chamber for preventing fluid flow between the chambers 13 and 71. Coaxially connected to movable abutment 67 is a pusher stem 73 which is adapted to abut and unseat valve 70 when brake pipe pressure in chamber 68 exceeds expansion reservoir pressure in chamber 13.

Chamber 71 is constantly open by way of a choke 74, a passage 75 and a release choke 76 to control reservoir passage 61. A check valve 77 is provided to permit fluid flow from a branch of passage 75 to chamber 71 in bypass of choke 74 and prevent such bypassing flow in the reverse direction, for reasons hereinafter to be explained; and a light helical bias spring 78 preferably is provided to act on the chamber 71 side of said check valve to assure positive seating thereof.

The inshot valve device 6 preferably comprises a movable abutment 79 subject at one side to pressure of fluid in a chamber 80 open to brake cylinder 52 via chamber 50 and at the opposite side to pressure of a helical bias spring 81 in an atmospheric chamber 82. Coaxially connected to movable abutment 79 is a cylindrical pusher stem 83 that extends through chamber 80 and has sealing, slidably guided contact with the wall of an aligned bore through a casing partition separating chamber 80 from a chamber 84 that is open to expansion reservoir 16 via a branch of passage 14. Arranged coaxially with movable abutment 79 is a preferably disc-shaped inshot valve 85 that is contained in a chamber 86 and normally biased by a light helical spring 87 in said chamber into seating contact with an annular valve seat rib encircling stem 83 with substantial clearance.

When brake cylinder pressure in chamber 80 is less than a preselected value, such as about 10 p.s.i., as determined by the value of spring 81, valve 85 will be held unseated, through the medium of pusher stem 83, for permitting brake pipe air to flow via chamber 68, a passage 88 and a chamber 89 to chamber 86 and thence past unseated inshot valve 85 to chamber 84 and expansion reservoir 16.

A check valve 91, interposed between chamber 89 and a chamber 92 that is open via an application choke 93 to a branch of passage 14, permits fluid under pressure to flow from expansion reservoir 16 to the brake pipe 10 at the rate controlled by choke 93 and in bypass of inshot valve 85 when expansion reservoir pressure exceeds brake pipe pressure by a slight degree, as determined by the valve of a light helical bias spring 94 acting on the brake pipe side of said check valve; and said check valve prevents such bypassing flow in the reverse direction.

The brake apparatus also preferably comprises means, positioned either manually or automatically according to the load carried by the sprung portion (not shown) of a railway car equipped with such apparatus, so as to provide any one of three braking ratios. For sake of simplification, such means has been shown illustratively as a manually operable braking ratio selector valve 95 of the plug type rotatably disposed in a valve casing and having two arcuately spaced valve cavities 96, 97. When valve 95 is rotated by an operating handle 98 to a load position, in which it is shown, cavity 96 is exposed solely to a branch of brake cylinder pipe 51, and cavity 97 connects chambers 49 and 48 to an exhaust port 99 in the valve casing.

*Operation—Fig. 1*

Assume initially that the brake apparatus is devoid of fluid under pressure and that the selector valve 95 is in its load position.

Under these conditions, a helical bias spring 100 disposed in chamber 50 of service valve device 3 and acting on movable abutment 46 will bias the movable abutment stacks 46, 45, 44, 31 and thereby the valve elements 47, 34 to a full release position, in which they are shown, and which position is defined by engagement of movable abutment 31 with a stop rib 101 formed in the end wall of chamber 32. With valve elements 47, 34 in full release position, brake cylinder supply valve 55 is seated by spring 58, and valve element 47 is spaced from valve 55 for venting the brake cylinder 52 to atmosphere via chamber 50, opening 53 and atmospheric chamber 42; and valve element 34 sealingly abuts quick volume vent valve 39 for cutting off the quick service volume 38 from expansion reservoir 16, and also unseats valve 39 for venting volume 38 to atmosphere. Also, under the assumed conditions, valve 21 of device 2 will be seated by spring 27 against valve seat rib 28, and valve element 17 will be operatively biased by spring 26 into sealing contact with emergency vent valve 23 but not unseat the latter against the stronger pressure exerted thereon by spring 25; charging valve 63 of device 4 will be seated by spring 65 for disconnecting chamber 64 from supply reservoir 57; valve 70 of device 5 will be seated by spring 72 for disconnecting expansion reservoir 16 from control reservoir 33; and spring 81 of device 6 acting through movable abutment 79 and stem 83 will hold inshot valve 85 operatively unseated against resistance of light spring 87 for connecting the brake pipe 10 to the expansion reservoir 16. Hence, under the assumed conditions, the various components of the apparatus will be in the respective positions in which they are shown in Fig. 1.

*Initial charging*

To initially charge the apparatus, fluid at the preselected normal charge value of brake pipe pressure is supplied to the brake pipe 10 at the locomotive in the well-known manner. On a particular car, some of the fluid thus supplied to the brake pipe 10 will flow through chamber 9, passage 69, chamber 68 and passage 88 and past unseated inshot valve 85 to chamber 84 and thence via passage 14 and chamber 15 to the expansion reservoir 16 for charging the latter at a substantially unrestricted rate.

Meanwhile, some of the pressure fluid supplied to expansion reservoir 16 will flow to chamber 13 of device 5 and unseat valve 70 against resistance of light spring 72 and flow past said valve into chamber 71, whence it will flow at the restricted rate controlled by the series-arranged chokes 74, 76 to control reservoir passage 61 for charging the control reservoir 33. It is to be noted that choke 74 is considerably more restricted than choke 76; that the chokes 74, 76 in series constitute a control reservoir charging choke means; and that check valve 77 will prevent fluid flow from chamber 71 to control reservoir passage 61 in bypass of choke 74.

Meanwhile, some of the fluid under pressure supplied from brake pipe 10 to passage 88 will flow through a branch of said passage and unseat a preferably ball-type check valve 102 against resistance of a light helical bias spring 103 and then flow past said check valve and through a passage 104 to chamber 64. As control reservoir pressure in chamber 60 of device 4 builds up, movable abutment 59 will be shifted and operatively unseat the supply reservoir charging valve 63 for permitting fluid under pressure to flow from the chamber 64 past said valve and via chamber 62 to the supply reservoir 57 for charging the latter. It will thus be noted that the charging valve device 4 operates to prevent the supply reservoir 57, irrespective of its selected volume, from being charged at a rate exceeding the rate at which control reservoir 33 is charged via chokes 74, 76, which is desirable because the volume of the supply reservoir 57 is so selected, in relation to the size of the brake cylinder 52, as to provide a desired brake cylinder pressure when supply reservoir pressure is permitted to equalize into the brake cylinder during an emergency application of brakes, as hereinafter more fully described. By way of contrast, in apparatus heretofore proposed, wherein the supply reservoir is charged directly from the brake pipe, such as by way of a charging check valve and charging choke, the size of the charging choke must be tuned to the particular volume of supply reservoir used.

Charging of the expansion reservoir 16, control reservoir 33 and supply reservoir 57 via the communications just described will continue until fluid pressure in reservoir 16 equalizes with brake pipe pressure and the reservoirs 33 and 57 are charged to substantially the preselected normal charge value of brake pipe pressure. As initial charging is completed, it will be apparent that valve 63 of device 4 will be reseated by pressure of spring 65, and valve 70 of device 5 will be seated by pressure of spring 72; and hence, at the completion of initial charging, the various components will once again have assumed the respective positions in which they are shown in Fig. 1.

It is to be noted that throughout initial charging, the service valve device 3 will be maintained in its previously defined full release position by spring 100 because control reservoir pressure in chamber 32 will never exceed expansion reservoir pressure in chamber 15; that the inshot valve 85 will be maintained unseated by spring 81 because chamber 80 and brake cylinder 52 are maintained vented by the service valve device in full release position; and that spring 26 of device 2 will maintain valve element 17 seated against valve 23 without unseating the latter against the stronger pressure of spring 25 because pressures in chambers 9 and 11 will remain equalized by way of the unseated inshot valve 85.

*Service application of brakes*

To effect a service application of brakes, pressure of fluid in the brake pipe 10 is reduced at the locomotive at a service rate in the well-known manner an extent corresponding to the degree of brake application desired.

On the car nearest the locomotive, as brake pipe pressure is thus reduced at a service rate, pressure of fluid in the expansion reservoir 16 will initially reduce at the same rate as brake pipe pressure by unrestricted backflow past the then unseated inshot valve 85. As soon as expansion reservoir pressure in chamber 15 of device 3 is reduced a relatively small degree, such as between 1 to 2 p.s.i., movable abutment 31 and hence valve elements 34, 47 will be shifted upwardly by preponderant control reservoir pressure in chamber 32 and against resistance of spring 100 from their above-defined full release position (in which they are shown) through a release position (hereinafter to be defined) to a preliminary quick service position, in which valve element 34 is disengaged from valve 39 which is then seated by spring 41, and brake cylinder supply valve 55 is still seated by spring 58; whereupon fluid under pressure will begin to flow from the expansion reservoir 16—and also from brake pipe 10 by way of unseated inshot valve 85—through choke 36, opening 35 and around the lower end of valve element 34 to the quick service volume 38 for commencing a local quick service reduction in expansion reservoir pressure and in brake pipe pressure.

Expansion reservoir pressure will thus rapidly reduce a sufficient degree to promptly cause movable abutment 31 and hence valve elements 34, 47 to shift further upwardly against resistance of springs 100 and 58 and supply reservoir pressure in chamber 56 from preliminary quick service position to a brake application position, in which brake cylinder supply valve 55 is unseated and valve element 34 is retracted further from the seated valve 39 for permitting the local quick service reduction in expansion reservoir pressure and brake pipe pressure to continue until pressures in the expansion reservoir 16 and brake pipe 10 have equalized into the quick service volume 38. By virtue of this local quick service reduction in brake pipe pressure on the car nearest the locomotive, a brake pipe pressure reduction wave will be propagated rearward through the train and be serially locally reinforced on each successive rearward car by similar local quick service reductions in brake pipe pressure, for promptly causing operation of the respective service valve devices on said rearward cars to brake application position.

On each car, with brake cylinder supply valve 55 unseated, fluid under pressure will flow from the supply reservoir 57 via chamber 50 to brake cylinder 52 at a substantially unrestricted rate for rapidly taking up slack in the brake rigging. When brake cylinder pressure as noted in chamber 80 exceeds the illustratively assumed 10 p.s.i., which is deemed sufficient to take up slack in the brake rigging, movable abutment 79 of device 6 will shift against resistance of spring 81 and retract stem 83 sufficiently to permit spring 87 to seat inshot valve 85; whereupon, as brake pipe pressure is further reduced at a service rate, further supply of supply reservoir air to the brake cylinder 52 will be limited according to the rate at which expansion reservoir air can be released into the brake pipe 10 by flow via application choke 93 and past check valve 91 in bypass of the now seated inshot valve 85.

The effective area of movable abutment 31 of device 3 is preferably about three times that of movable abutment 46, about 2.5 times that of movable abutment 45 and about twice that of movable abutment 44, so as to provide different braking ratios for service applications of brakes according to the load condition of the car. Thus, with valve 95 in load position, in which it is shown and in which chambers 49 and 48 are vented, supply reservoir air will flow past valve 55 to the brake cylinder 52 until brake cylinder pressure as noted in chamber 50 has increased to a value approximately three times the extent by which expansion reservoir pressure has been reduced below its normal charge value (or, in other words, reduced below the value of control reservoir pressure in chamber 32) due to the aforementioned ratio in effective areas of movable abutments 31 and 46; whereupon the movable abutment stack and hence valve elements 47, 34 will be shifted slightly downward to a lap position, in which brake cylinder supply valve 55 is seated by spring 58 for cutting off supply reservoir 57 from brake cylinder 52, valve element 47 seals against valve 55 for sealing off vent opening 53 from said brake cylinder, and valve element 17 is disengaged from the seated valve 39. Thus, with valve elements 47, 34 in lap position, fluid will be bottled up in brake cylinder 52 at a pressure substantially proportionate to the extent of reduction in expansion reservoir pressure which, in turn, will have reduced to the same extent (except for the light bias of spring 94 on check valve 91) as the reduction in brake pipe pressure effected at a service rate by the operator.

If, however, braking ratio selector valve 95 is in a partial load position, in which valve cavity 96 connects a branch of brake cylinder pipe 51 to chamber 49 and valve cavity 97 connects only chamber 48 to exhaust port 99, operation of the valve elements 47, 34 will be controlled by the effect of brake cylinder pressure in chamber 49 acting on the effective area of movable abutment 45, because the smaller movable abutment 46 will be rendered ineffective by being subjected at both sides to brake cylinder pressure. Similarly, it will be apparent that if valve 95 is in an empty position, in which valve cavity 96 connects both chambers 49 and 48 to brake cylinder pipe 51, then the pressures will be balanced across movable abutment 45 and movable abutment 46 and operation of the valve elements 47, 34 will therefore be controlled by brake cylinder pressure effective in chamber 48 on the larger effective area of movable abutment 44. Hence, during a service application of brakes, valve elements 47, 34 will move to lap position when brake cylinder pressure has been increased to a value which is approximately 3 times, 2.5 times or twice the net effective pressure acting on movable abutment 31, according to whether valve 95 is in its load, partial load or empty position, respectively.

It will be apparent that if the feature whereby braking ratio is controlled according to vehicle load is not desired, then a modified service valve device could be employed in which movable abutments 44, 45 are eliminated and movable abutment 46 is constantly subject at its upper side to pressure of fluid in the brake cylinder 52 and at its lower side to atmospheric pressure.

It will be noted that, during a service (and also an emergency) application of brakes: valve 63 of device 4 will be unseated but check valve 102 will be held positively seated by supply reservoir pressure and spring 103 for preventing release of supply reservoir air into the brake pipe 10; that brake pipe pressure in chamber 68 of device 5 will never exceed expansion reservoir pressure in chamber 13, and hence valve 70 will serve as a control reservoir charging check valve and be maintained seated by spring 72, for positively preventing any backflow whatsoever of fluid under pressure from control reservoir 33 into expansion reservoir 16 during such brake application; and that expansion reservoir pressure in chamber 11 of device 2 will never be less than brake pipe pressure in chamber 9, and hence spring 26 will maintain valve element 17 seated against vent valve 23 for preventing any backflow whatsoever of air from supply reservoir 57 into brake pipe 10 during a brake application. It will further be noted that during a service application of brakes, spring 25 of device 2 is of sufficient force to assure that, after seating of inshot valve 85 and consequent restriction of the rate of release of expansion reservoir air into the brake pipe via choke 93, no differential will be developed across movable abutment 8 sufficient to cause unseating of emergency vent valve 23, even if a full service reduction in brake pipe pressure is effected by the operator at the locomotive.

Release of a service application of brakes

With a fluid pressure brake apparatus of the type herein described, it is possible to effect a graduated release of a service application of brakes in as many as five or six steps or stages or to effect a complete direct release of brakes by increasing brake pipe pressure a relatively small extent at the locomotive, as will now be described.

To cause a graduated release of brakes, the operator effects, in the well-known manner, a slight increase in pressure of fluid in the brake pipe 10 at the locomotive of a degree sufficient to so increase brake pipe pressure in chamber 9 of device 2 on the car nearest the locomotive as to cause the corresponding movable abutment 8 to shift, against resistance of spring 26 and expansion reservoir pressure in chamber 11, to a position in which the cage of spring 30 engages casing partition 19 without compressing spring 30 and valve element 17 is disengaged from valve 23; it being noted that prior to such slight increase in brake pipe pressure, expansion reservoir pressure will be only a very slight degree (not more than 1 p.s.i. as determined by the bias effect of spring 94) higher than brake pipe pressure. Since control reservoir pressure in chamber 60 of device 4 exceeds supply reservoir pressure in chamber 62, charging valve 63 will be operatively unseated by movable abutment 59; and hence, when valve element 17 is disengaged from valve 23, fluid under pressure will flow from supply reservoir 57 to the brake pipe 10 initially at a substantially unrestricted rate via unseated valve 63, chamber 64, a passage 105a, chamber 20, passage 18 and chamber 9 and in bypass of choke 22 until brake pipe pressure is locally increased sufficiently to shift movable abutment 8 further upward against the combined resistance of springs 26 and 30 and carry valve element 17 into seating contact with valve 21, which is then seated against seat rib 28 by spring 27. With valve element 17 thus seated against valve 21, supply reservoir air will continue to flow to the brake pipe 10 but by way of unseated valve 63, passage 105a, chamber 20, port 29, choke 22 and opening 18 at the very restricted rate controlled by choke 22.

The local increase in brake pipe pressure thus effected by backdump of supply reservoir air into the brake pipe at the car nearest the locomotive will cause a sufficient increase in brake pipe pressure on the adjacent rearward car to initiate operation, in similar manner, of the valve device 2 on the latter car, with the result that a brake pipe pressure increase wave will be propagated serially from car to car rearward through the train for promptly and more uniformly initiating a release of brakes throughout the train than possible with fluid pressure brake apparatus heretofore proposed.

On each car, expansion reservoir pressure will be prevented by check valve 91 and by the then seated inshot valve 85 from increasing with brake pipe pressure, and hence the rapid increase in brake pipe pressure thus locally effected in chamber 68 of device 5 will cause movable abutment 67 to shift against the lesser expansion reservoir pressure in chamber 13 and operatively unseat valve 70; whereupon, fluid under pressure will flow from the control reservoir 33 via passage 61 and at the rate controlled by the release choke 76, to passage 75 and unseat and flow past check valve 77 to chamber 71, and then flow past unseated valve 70 and via passage 14 to expansion reservoir 16. Fluid under pressure will thus flow from control reservoir 33 to expansion reservoir 16 until expansion reservoir pressure in chamber 13 of device 5 has increased to substantially the value of brake pipe pressure as noted in chamber 68; whereupon valve 70 will be seated by spring 72 for cutting off further flow from the control reservoir to the expansion reservoir. The volume of expansion reservoir 16 is so related to that of control reservoir 33 that, when a minimum increase in brake pipe pressure has been effected at the locomotive as above assumed, control reservoir pressure will be reduced about 2 p.s.i. and thereby cause an increase in expansion reservoir pressure in chamber 13 of device 5 which will be sufficient to substantially balance the existing locally increased value of brake pipe pressure in chamber 68 and thus permit closure of valve 70 by spring 72.

Meanwhile, and before valve 70 closes, the increase in expansion reservoir pressure noted in chamber 11 of device 2 will cause movable abutment 8 to be moved downwardly, assisted by springs 26, 30 and supply reservoir pressure acting on valve 21, until valve element 17 again seals against valve 23 and thereby cuts off flow of supply reservoir air to the brake pipe 10; it being noted that the bias thus exerted on movable abutment 8 exceeds the bias exerted on movable abutment 67 of device 5 by the spring 72, and that the flow capacity of choke 22 is substantially smaller than that of choke 76. With valve 21 thus disengaged from seat rib 28 and sealed against the valve element 17, pressure in passage 18 will build up via choke 22 until pressures substantially equalize across valve 21; whereupon valve 21 will be returned by spring 27 into seating contact with said seat rib and be disengaged from valve element 17 in readiness for a subsequent graduated release step or stage.

Meanwhile, as control reservoir pressure in chamber 32 reduces and expansion reservoir pressure in chamber 15 increases, the movable abutment stack of device 3 and hence valve elements 34, 47 will be shifted downwardly from their lap position to their release position, which is between lap position and full release position. In release position, valve element 47 is disengaged from the seated brake cylinder supply valve 55 for permitting fluid under pressure to flow from brake cylinder 52 to atmosphere via opening 53 and chamber 42, and valve element 34 seals against valve 39 without unseating the latter against the force of light spring 41.

If, as was above assumed, the operator merely effected a minimum increase in brake pipe pressure sufficient to cause disengagement of valve element 17 of the valve device 2 on the car nearest the locomotive from its corresponding valve 23 and then lapped the brake pipe at the locomotive, brake cylinder pressure will blow down via opening 53 and atmospheric chamber 42 at a rate corresponding to the rate at which control reservoir pressure is reduced by flow through release choke 76 and past check valve 77 and unseated valve 70 into expansion reservoir 16, and to a degree proportionate to the change in net effective pressure acting on movable abutment 31.

Brake cylinder pressure may thereafter be further released in successive steps or stages in the same manner as above described by effecting additional minimum increases in brake pipe pressure at the locomotive merely sufficient to actuate the quick release valve device 2 on the car nearest the locomotive and then lapping the brake pipe at the locomotive, as will be understood from the foregoing.

If, however, a graduated release of brake cylinder pressure of a degree greater than a single release step or stage is desired, then the operator effects an increase in brake pipe pressure at the locomotive greater than the aforementioned minimum increase and corresponding to the degree of brake release desired, and then laps the brake pipe 10 at the locomotive. Under this condition, on each car fluid under pressure will be released from supply reservoir 57 into the brake pipe 10 initially in bypass of choke 22 and then via and at the rate controlled by choke 22 of device 2 in the same manner as above-described, until sufficient fluid under pressure has been released from control reservoir 33 into expansion reservoir 16 via release choke 76 and past check valve 77 and past unseated valve 70 to cause expansion reservoir pressure in chamber 11 to increase sufficiently to permit spring 26 to reseat valve element 17 against valve 23 and terminate the restricted flow via choke 22 from the supply reservoir 57 to the brake pipe; it being again emphasized that the flow capacity of choke 22 is substantially less than that of choke 76. Thereafter, fluid under pressure will continue to flow from control reservoir 33 to expansion reservoir 16 via release choke 76 and past valve 70 until expansion reservoir pressure in chamber 13 of device 5 has increased to substantially the value of the then lapped brake pipe pressure in chamber 68; whereupon valve 70 will be reseated by spring 72 for bottling up fluid in the control reservoir 33 and expansion reservoir 16. The service valve device 3 will operate, in the manner above described, to release brake cylinder pressure to an extent proportionate to the change in net effective pressure acting on movable abutment 31.

To effect a so-called direct complete release of brakes, the operator causes fluid under pressure to be continuously supplied to the brake pipe 10 at the locomotive. Under this condition, the reduction in brake pipe pressure in chamber 9 on the car nearest the locomotive may cause the valve element 17, in one continuous movement, to shift directly into contact with the seated valve 21 and thus immediately restrict the rate of local backdump of supply reservoir air to the brake pipe; however, on the cars rearward of about the fourth car in the train, where the rate of brake pipe pressure rise will not be as great, the valve devices 2 will operate to successively backdump a limited quantity of supply reservoir air into the brake pipe initially at a substantially unrestricted rate in bypass of choke 22 and then at the restricted rate controlled by choke 22, with the result that a pressure increase wave will be propagated rearward through the train and serially reinforced on each successive rearward car in the manner discussed in connection with a minimum increase in brake pipe pressure.

On each car, since brake pipe pressure in chamber 68 is continually increasing, valve 70 will be held unseated and permit fluid under pressure to flow from control reservoir 33 to the expansion reservoir 16 at the rate controlled by release choke 76 and via check valve 77 until pressures in said reservoirs have equalized. Meanwhile, the movable abutment stack of service valve device 3 will operate to carry valve elements 34, 47 initially to their release positions, in which fluid under pressure is released from the brake cylinder 52 to atmosphere via opening 53 and chamber 42 and valve 39 is seated; and then, as pressures in chambers 15 and 32 approach equalization, to their full release positions, in which valve 39 is unseated for venting quick service volume 38 to atmosphere, while the brake cylinder is still connected to opening 53 and atmospheric chamber 42.

When, during a release of brakes, brake cylinder pressure in chamber 80 of device 6 reduces below the illustrative 10 p.s.i., inshot valve 85 will be operatively reopened by pressure of spring 81 and cause expansion reservoir pressure to equalize with brake pipe pressure. Pressure of fluid in the control reservoir 33 will be restored to substantial equality with expansion reservoir pressure and hence with brake pipe pressure by flow of fluid under pressure from expansion reservoir 16 past valve 70 against resistance of light spring 72 and at the rate controlled by chokes 74, 76; and supply reservoir 57 will be recharged to substantially the value of brake pipe pressure via check valve 102 and valve 63, in the same manner as described in connection with initial charging.

From the foregoing, it will be apparent that the improved brake controlling valve device 1 responds to successive controlled minimum increases in brake pipe pressure at the locomotive to effect graduated releases of brake cylinder pressure in a series of successive steps or stages, brake cylinder pressure during each graduated release step being reduced at the rate controlled by choke 76 and of a chosen degree depending upon the selected ratio of the volumes of the control reservoir 33 and expansion reservoir 16, the selected ratio of flow capacities of chokes 76 and 22, and the selected force of spring 30. It will also be noted that graduated releases of brake cylinder pressure of a degree exceeding that corresponding to a graduated release step may be obtained by effecting a controlled increase in brake pipe pressure at the locomotive of more than said controlled minimum increase. It will further be noted that by effecting a substantially uninterrupted increase in brake pipe pressure at the locomotive a complete direct release of brake cylinder pressure may be obtained without the necessity of restoring brake pipe pressure on a particular car to substantially its full charge value. Thus, brake cylinder pressure can be reduced in a number of steps or stages or may be completely and directly released without substantial supply of fluid under pressure to the brake pipe 10 at the locomotive.

Following a complete release of brake cylinder pressure, the various valve devices will once again be in the respective positions in which they are shown in Fig. 1.

*Emergency application of brakes*

To effect an emergency application of brakes, brake pipe pressure is reduced at the locomotive at an emergency rate, in the well-known manner. On a particular car, expansion reservoir pressure will reduce initially with and at the same rate as brake pipe pressure and cause the valve elements 34, 47 of service valve device 3 to be shifted upwardly successively to preliminary quick service position and then to brake application position, for causing a local quick service reduction in expansion reservoir pressure and in brake pipe pressure and also causing fluid under pressure to flow at a relatively unrestricted rate to the brake cylinder 52 for rapidly taking up slack in the brake rigging.

When brake cylinder pressure in chamber 80 exceeds the illustratively assumed 10 p.s.i., the inshot valve 85 will be seated by pressure of spring 87; whereupon blowdown of expansion reservoir pressure into the brake pipe 10 will be limited to the flow capacity of application choke 93. Thus, brake pipe pressure in chamber 9 of device 2 will rapidly reduce below expansion reservoir pressure in chamber 11 and the pressure differential thus developed across the large area of movable abutment 8 will cause the latter to move downwardly and operatively unseat emergency vent valve 23 against resistance of spring 25 for establishing a large capacity vent connection of the brake pipe 10 to atmosphere on each car.

In service valve device 3, expansion reservoir pressure in chamber 15 will blow down via choke 93 and check valve 91 into the vented brake pipe 10, with the result that the valve elements 34, 47 will be shifted to, and remain in, their brake application position and thus cause pressure of fluid in the supply reservoir 57 to equalize past unseated valve 55 into brake cylinder 52 for providing a brake application of a greater degree than obtained in response to a full service reduction in brake pipe pressure. The volume of supply reservoir 57 is therefore so selected as to provide, for a given size of brake cylinder 52, a desired brake cylinder pressure when supply reservoir pressure is permitted to equalize into the brake cylinder during an emergency application of brakes.

To release an emergency application of brakes, the brake pipe is recharged with fluid under pressure at the locomotive, in the well-known manner. Thereafter, the brake apparatus will operate in substantially the same manner as described in connection with a direct complete release of a service application to vent the brake cylinder 52, to recharge the expansion reservoir 16 to equality with brake pipe pressure, and to recharge the control reservoir 33 and supply reservoir 57 to substantial equality with brake pipe pressure.

Figure 2:
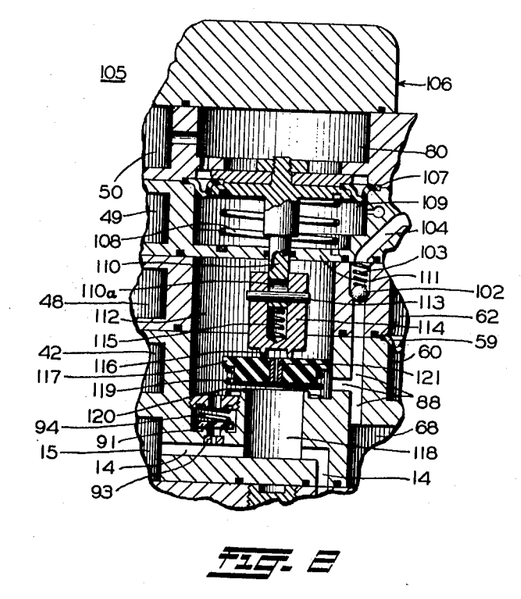
Fig. 2 is a diagrammatic view of another embodiment of an inshot valve device included in the showing of Fig. 1.

*Description and operation—Fig. 2*

According to this embodiment of the invention, a modified brake controlling valve device 105 is provided which is identical with the brake controlling valve device 1 shown in Fig. 1 except for the provision of a modified inshot valve device 106 in lieu of the inshot valve device 6. All structure in the embodiment of Fig. 2 which is equivalent to the structure shown and described in connection with Fig. 1 has been designated by the same reference numerals as used in Fig. 1 for facility of understanding.

The inshot valve device 106 comprises a movable abutment 107 subject opposingly to brake cylinder pressure in chamber 80 and to pressure of a helical spring 108 in an atmospheric chamber 109. Coaxially connected to movable abutment 107 is a stem 110 which, intermediate its ends, has sealing, slidably guided contact with the wall of an aligned bore through a casing partition 111 separating chamber 109 from a chamber 112 that is open to the brake pipe 10 via passage 88. A pin 113, carried by a cup-shaped member 114 that overlies the lower portion of stem 110 extending into chamber 112, extends transversely through said member and through an axially elongated slot 110a formed in said stem for providing a lost motion connection between said member and stem. A helical spring 115 is interposed between the lower end of stem 110 and the recessed upper side of member 114 for biasing the latter downwardly, such that pin 113 engages a part of stem 110 defining the lower end of slot 110a. An annular valve seat rib 116 formed integrally with the lower end of member 114 is adapted to abut the upper side of a coaxially arranged preferably disc-shaped inshot valve 117 that is contained in chamber 112 and controls fluid pressure communication between chamber 112 and a chamber 118 that has unrestricted communication with expansion reservoir passage 14. A helical bias spring 119, which is disposed in chamber 112 and is of less force than spring 115, biases valve 117 toward seating contact with rib 116.

When the brake cylinder 52 and hence chamber 80 are devoid of fluid under pressure, spring 108, acting through movable abutment 107, will bias stem 110 to an upper position for causing spring 115 to shift member 114 downward an extent limited by contact of pin 113 with the lower end of slot 110a, and thus enabling spring 119 to bias inshot valve 117 out of contact with an annular valve seat rib 120 encircling chamber 118 and into contact with rib 116 for thereby providing substantially unrestricted fluid communication between brake pipe passage 88 and expansion reservoir passage 14.

Thus, during initial charging of the apparatus, fluid under pressure will flow from the brake pipe 10 to the expansion reservoir 16 at a substantially unrestricted rate by way of the unseated inshot valve 117. During a service or emergency rate of reduction in brake pipe pressure, fluid flow between the brake pipe 10 and expansion reservoir 16 will be substantially unrestricted until brake cylinder pressure in chamber 80 exceeds a preselected value, such as about 10 p.s.i., as determined by the force of spring 108, which preselected value is sufficient to effect take-up of slack in the brake rigging; whereupon movable abutment 107 will be shifted downwardly and through the medium of stem 110, spring 115, member 114 and rib 116, cause inshot valve 117 to be seated against seat rib 120 against opposition of the light spring 119. After inshot valve 117 is seated, fluid under pressure will flow from expansion reservoir 16 into the brake pipe 10 by way of passage 14, application choke 93, check valve 91, chamber 112 and passage 88 until equalizing reservoir pressure has been reduced to a value slightly higher (due to the light force of spring 94) than existing brake pipe pressure.

It is to be noted, that in view of the lost motion connection between movable abutment stem 110 and member 114 afforded by the pin 113 and slot 110a, member 114 and pin 113 will not move downwardly to the same degree as stem 110; and hence inshot valve 117 will be seated by the excess pressure of spring 115 over that of spring 119 rather than by a substantially greater force (corresponding to the difference in forces exerted on movable abutment 107 by brake cylinder pressure and by spring 108) and which substantially greater force would tend to undesirably score the surface of valve 117 that engages seat rib 120.

When brake pipe pressure is increased for releasing a brake application, seat rib 116 will sealingly engage inshot valve 117 in encirclement of a choke 121 therethrough and hold said inshot valve seated until brake cylinder pressure in chamber 80 reduces below the illustrative 10 p.s.i.; whereupon movable abutment 107 and stem 110 will be shifted upwardly by spring 108. Since expansion reservoir pressure has thus far been prevented from increasing with brake pipe pressure, movable abutment 107, during such upward movement, will carry seat rib 116 away from inshot valve 117 and the latter will be maintained seated by brake pipe pressure in chamber 112 against resistance of light spring 119 and expansion reservoir pressure in chamber 118 until expansion reservoir 16 has been charged, by flow via and at the rate controlled by choke 121, to within a preselected degree of brake pipe pressure, as determined by the value of spring 119; whereupon inshot valve 117 will be unseated by spring 119 for establishing substantially unrestricted communication between the brake pipe 10 and expansion reservoir 16 and thus enabling the expansion reservoir to be recharged to equality with brake pipe pressure.

It will thus be seen that inshot valve device 106 is operative to close the inshot valve 117 and thus close an unrestricted flow connection between the brake pipe and expansion reservoir 16 when brake cylinder pressure exceeds a preselected value; is operative to maintain the inshot valve closed but establish a very restricted flow connection between the brake pipe and expansion reservoir when brake cylinder pressure reduces below said preselected value; and is operative to reestablish the unrestricted flow connection between the brake pipe and expansion reservoir only when expansion reservoir pressure is within a chosen degree of brake pipe pressure.

On some railroads it is the practice to effect a release of brakes by initially supplying air at main reservoir pressure to the brake pipe at the locomotive to initiate a rapid brake pipe pressure increase wave through a long train and then, after a short interval of time, connecting the brake pipe at the locomotive to a source of air at the normal charge value of brake pipe pressure to reduce the possibility of overcharging the control reservoirs and supply reservoirs on the cars near the head of the train. This apparatus is highly desirable for use on railway cars on such railroads because the flow capacity of choke 121 can be restricted sufficiently so that while chamber 112 is charged to above the normal charge value of brake pipe pressure, during the aforementioned interval of time, the inshot valve 117 will be positively maintained seated and thus so restrict flow to the expansion reservoir 16 as to positively prevent overcharging of the control reservoir 33 via chokes 74, 76 and valve 70; and by thus limiting the control reservoir pressure obtainable in chamber 60 of device 4, such apparatus will prevent the supply reservoir 57 from being charged by way of check valve 102 and valve 63 to a value exceeding the value of control reservoir pressure.

Having now described the invention, what I claim as new and desire to secure by Letters Patent is:

1. In a fluid pressure brake apparatus, the combination of a normally charged brake pipe, a control reservoir containing fluid at substantially the normal charge value of brake pipe pressure, an expansion reservoir, means defining a normally open flow connection permitting fluid flow between the brake pipe and expansion reservoir, a brake cylinder, valve means responsive to brake cylinder pressure in excess of a preselected value to effect closure of said flow connection, means defining a normally closed communication of lesser flow capacity than said flow connection and extending between said expansion reservoir and brake pipe in bypass of said flow connection, means responsive to a preponderance of expansion reservoir pressure over brake pipe pressure to open said communication, and service valve means subject to control reservoir pressure acting in opposition to expansion reservoir pressure and brake cylinder pressure and responsive to a reduction in expansion reservoir pressure resultant from a reduction in brake pipe pressure to initially effect supply of fluid under pressure to said brake cylinder at a relatively fast rate until closure of said flow connection and then operative to effect further supply of fluid under pressure to said brake cylinder at a slower rate corresponding to the rate at which expansion reservoir pressure can reduce by flow into the brake pipe via said communication.

2. The combination according to claim 1, including normally closed valve means opened responsively to a reduction in brake pipe pressure in excess of a predetermined degree below expansion reservoir pressure for locally releasing fluid under pressure from the brake pipe at a rapid rate, said predetermined degree exceeding the maximum fluid pressure differential obtainable between expansion reservoir pressure and brake pipe pressure during blowdown of expansion reservoir pressure via and at the rate controlled by said communication responsively to a full service reduction in brake pipe pressure, such that said predetermined degree will be exceeded only when brake pipe pressure is reduced at an emergency rate.

3. In a fluid pressure brake apparatus, the combination of a normally charged brake pipe in which pressure of fluid is decreased and increased for respectively causing a brake application and a release of a brake application, a control reservoir normally charged with fluid at substantially the normal charge value of brake pipe pressure, an expansion reservoir, means defining a normally open flow connection permitting fluid flow between the brake pipe and expansion reservoir, a brake cylinder, service valve means subject to control reservoir pressure acting in opposition to expansion reservoir pressure and brake cylinder pressure and operative to provide in the brake cylinder fluid at a pressure substantially proportionate to the magnitude of the differential between control reservoir pressure and expansion reservoir pressure, valve means responsive to brake cylinder pressure in excess of a preselected value to effect closure of said flow connection, means defining a normally closed communication of lesser flow capacity than said flow connection and extending between said expansion reservoir and brake pipe in by-pass of said flow connection, said communication being opened responsively to a preponderance of expansion reservoir pressure over brake pipe pressure such that after closure of said flow connection said differential will increase at the rate controlled by said communication and thereby control the rate of buildup of brake cylinder pressure, and means responsive to a preponderance of brake pipe pressure over expansion reservoir pressure to permit fluid flow from the control reservoir to the expansion reservoir and thereby so reduce said differential as to cause said service valve means to operate to effect a reduction in brake cylinder pressure of a degree corresponding to the extent of such reduction in said differential.

4. In a fluid pressure brake apparatus, the combination of a normally charged brake pipe, a control reservoir normally charged with fluid at substantially the normal charge value of brake pipe pressure, an expansion reservoir, means defining a normally open flow connection permitting fluid flow between the brake pipe and expansion reservoir, a brake cylinder, valve means responsive to brake cylinder pressure in excess of a preselected value to effect closure of said flow connection, means defining a normally closed communication of lesser flow capacity than said flow connection and extending between said expansion reservoir and brake pipe in bypass of said flow connection, means responsive to a preponderance of expansion reservoir pressure over brake pipe pressure to open said communication, service valve means subject to control reservoir pressure acting in opposition to expansion reservoir pressure and brake cylinder pressure and responsive to a reduction in expansion reservoir pressure resultant from a reduction in brake pipe pressure to initially effect supply of fluid under pressure to said brake cylinder at a relatively fast rate until closure of said flow connection and then operative to effect further supply of fluid under pressure to said brake cylinder at a slower rate corresponding to the rate at which expansion reservoir pressure can reduce by flow into the brake pipe via said communication, means defining a normally closed restricted communication through which fluid under pressure may flow from said control reservoir into said expansion reservoir, and means responsive to an increase in brake pipe pressure over expansion reservoir pressure to open said restricted communication for increasing expansion reservoir pressure and decreasing control reservoir pressure until expansion reservoir pressure has increased to substantially such increased value of brake pipe pressure for thereby causing said service valve means to operate to release brake cylinder pressure at a rate controlled according to the flow capacity of said restricted communication and to a degree proportionate to the extent of reduction in differential between control reservoir pressure and expansion reservoir pressure.

5. In a fluid pressure brake apparatus, the combination of a normally charged brake pipe in which pressure of fluid is decreased and increased for respectively causing an application and a release of brakes, a control reservoir normally charged with fluid at substantially the normal charge value of brake pipe pressure, an expansion reservoir, means defining a normally open flow connection permitting fluid flow at a substantially unrestricted rate between the brake pipe and expansion reservoir, a brake cylinder, service valve means subject to control reservoir pressure acting in opposition to expansion reservoir pressure and brake cylinder pressure and operative to provide in the brake cylinder fluid at a pressure substantially proportionate to the differential between control reservoir pressure and expansion reservoir pressure, inshot valve means responsive to brake cylinder pressure in excess of preselected value to effect closure of said flow connection, means for permitting restricted flow from the expansion reservoir to the brake pipe in bypass of said flow connection and preventing such bypassing flow in the reverse direction, and means responsive to a preponderance of brake pipe pressure over expansion reservoir pressure for permitting fluid to flow at a restricted rate from the control reservoir to the expansion reservoir until expansion reservoir pressure has increased to substantially the existing value of brake pipe pressure for thereby so reducing said differential as to cause said service valve means to operate to effect a reduction in brake cylinder pressure at a rate controlled by said restricted rate and to a degree corresponding to the extent of such reduction in said differential.

6. In a fluid pressure brake apparatus, the combination of a normally charged brake pipe in which fluid pressure is decreased and increased for respectively causing an application and a release of brakes, an expansion reservoir, a control reservoir, a brake cylinder, service valve means controlled by control reservoir pressure opposing expansion reservoir pressure and brake cylinder pressure and operative to provide in the brake cylinder fluid at a pressure substantially proportionate to the differential between control reservoir pressure and expansion reservoir pressure, valve means normally establishing a connection through which fluid under pressure may flow between the brake pipe and expansion reservoir and responsive to a brake cylinder pressure in excess of a preselected value to disestablish said connection, application choke means, means for permitting flow from the expansion reservoir into the brake pipe at a restricted rate via said application choke means in bypass of said connection and preventing such bypassing flow in the reverse direction, means defining a chamber, other valve means for permitting fluid flow from said expansion reservoir into said chamber and normally preventing flow in the reverse direction, two chokes interposed serially in a passage through which pressure fluid may flow from said chamber to the control reservoir for charging the latter at a relatively slow rate via both such chokes, one of said chokes being of substantially greater flow capacity than the other of said chokes, check valve means for permitting fluid flow from said control reservoir to said chamber via said one choke and a branch of said passage in bypass of said other choke and preventing such bypassing flow in the reverse direction, and means responsive to a preponderance in brake pipe pressure over expansion reservoir pressure to effect opening of said other valve means for causing a backdump of fluid under pressure from the control reservoir into said expansion reservoir via said check valve means and chamber at the rate controlled by said one choke for thereby reducing said differential until expansion reservoir pressure has increased to substantially the existing value of brake pipe pressure, so as to thereby cause said service valve means to operate to effect a reduction in brake cylinder pressure of a degree corresponding to the extent of reduction in such differential and at a rate controlled by the flow capacity of said one choke.

7. In a fluid pressure brake apparatus, the combination of a normally charged brake pipe in which fluid pressure is decreased and increased for respectively causing an application and a release of brakes, an expansion reservoir, a control reservoir, a supply reservoir, a brake cylinder, service valve means controlled by control reservoir pressure opposing expansion reservoir pressure and brake cylinder pressure and operative to supply fluid from the supply reservoir to the brake cylinder at a pressure substantially proportionate to the degree of reduction in expansion reservoir pressure below control reservoir pressure and operative to release brake cylinder pressure to a degree corresponding to the extent of reduction in differential between control reservoir pressure and expansion reservoir pressure, valve means normally establishing a connection through which fluid under pressure may flow between the brake pipe and expansion reservoir and responsive to a brake cylinder pressure in excess of a preselected value to disestablish such connection, means for permitting restricted flow of fluid from the expansion reservoir into the brake pipe in bypass of said connection and preventing such restricted bypassing flow in the reverse direction, flow restricting means, a valve for permitting fluid flow from the expansion reservoir to the control reservoir via said flow restricting means for charging the control reservoir, check valve means permitting fluid flow from the brake pipe to a chamber and preventing fluid flow in the reverse direction, valve means normally preventing fluid flow from said chamber to said supply reservoir, and means for opening the last-named valve means when control reservoir pressure exceeds supply reservoir pressure such that charging of said supply reservoir, irrespective of its selected capacity, will be controlled according to the rate at which the control reservoir is charged via said flow restricting means.

8. The combination according to claim 7, including means responsive to an increase in brake pipe pressure over expansion reservoir pressure to permit flow of fluid under pressure from said control reservoir to said expansion reservoir for reducing said differential until expansion reservoir pressure has increased to substantially the increased value of brake pipe pressure.

9. In a fluid pressure brake apparatus, the combination of a normally charged brake pipe in which fluid pressure is decreased and increased for respectively causing an application and a release of brakes, an expansion reservoir, a control reservoir normally containing fluid at substantially the normal charge value of brake pipe pressure, a supply reservoir normally charged with fluid under pressure, a brake cylinder, service valve means controlled by control reservoir pressure opposing expansion reservoir pressure and brake cylinder pressure and operative to supply fluid from the supply reservoir to the brake cylinder at a pressure substantially proportionate to the degree of reduction in expansion reservoir pressure below control reservoir pressure and operative to release brake cylinder pressure to a degree corresponding to the extent of reduction in differential between control reservoir pressure and expansion reservoir pressure, valve means normally establishing a connection through which fluid under pressure may flow between the brake pipe and expansion reservoir and responsive to a brake cylinder pressure in excess of a preselected value to disestablish such connection, means for permitting restricted flow of fluid from the expansion reservoir into the brake pipe in bypass of said connection during a reduction in brake pipe pressure and preventing such bypassing flow in the reverse direction, means defining a communication through which fluid under pressure may flow from the supply reservoir to the brake pipe, bias means, and valve means controlled by expansion reservoir pressure and pressure of said bias means opposing brake pipe pressure for normally closing said communication and responsive to an increase in brake pipe pressure over expansion reservoir pressure to open said communication for effecting a local increase in brake pipe pressure which will assist in propagating a pressure increase wave through the brake pipe to hasten initiation of a release of brakes through a train.

10. In a fluid pressure brake apparatus, the combination of a normally charged brake pipe in which fluid pressure is decreased and increased for respectively causing an application and a release of brakes, an expansion reservoir, a control reservoir normally charged with fluid at substantially the normal charge value of brake pipe pressure, a supply reservoir normally charged with fluid under pressure, a brake cylinder, service valve means controlled by control reservoir pressure opposing expansion reservoir pressure and brake cylinder pressure and operative to supply fluid from the supply reservoir to the brake cylinder at a pressure substantially proportionate to the degree of reduction in expansion reservoir pressure below control reservoir pressure and operative to release brake cylinder pressure to a degree corresponding to the extent of reduction in differential between control reservoir pressure and expansion reservoir pressure, valve means normally establishing a connection through which fluid under pressure may flow between the brake pipe and expansion reservoir and responsive to a brake cylinder pressure in excess of a preselected value to disestablish such connection, means for permitting restricted flow of fluid from the expansion reservoir into the brake pipe in bypass of said connection during a reduction in brake pipe pressure and preventing such bypassing flow in the reverse direction, bias means, and a valve device subject to brake pipe pressure acting in opposition to expansion reservoir pressure and pressure of said bias means and normally biased to one position for preventing flow of fluid under pressure from the supply reservoir to the brake pipe, said valve device being responsive to a slight increase in brake pipe pressure over expansion reservoir pressure to move to another position for backdumping fluid under pressure from the supply reservoir into the brake pipe.

11. In a fluid pressure brake apparatus, the combination of a normally charged brake pipe in which fluid pressure is decreased and increased for respectively causing an application and a release of brakes, an expansion reservoir, a control reservoir normally containing fluid at substantially the normal charge value of brake pipe pressure, a supply reservoir normally charged with fluid under pressure, a brake cylinder, service valve means controlled by control reservoir pressure opposing expansion reservoir pressure and brake cylinder pressure and operative to supply fluid from the supply reservoir to the brake cylinder at a pressure substantially proportionate to the degree of reduction in expansion reservoir pressure below control reservoir pressure and operative to release brake cylinder pressure to a degree corresponding to the extent of reduction in differential between control reservoir pressure and expansion reservoir pressure, valve means normally establishing a connection through which fluid under pressure may flow between the brake pipe and expansion reservoir and responsive to a brake cylinder pressure in excess of a preselected value to disestablish such connection, means for permitting restricted flow of fluid from the expansion reservoir into the brake pipe in bypass of and at a slower rate than via said connection and preventing such bypassing flow in the reverse direction, a spring, normally ineffective caged spring means, and a valve device controlled by brake pipe pressure acting in opposition to expansion reservoir pressure and to pressure of said spring and to pressure of said caged spring means when the latter is effective, said valve device normally being biased by said spring to one position for closing one communication through which fluid under pressure can flow from the supply reservoir to the brake pipe at a substantially unrestricted rate and also concurrently closing another communication through which fluid under pressure can flow from the supply reservoir to the brake pipe at a restricted rate, said valve device being responsive to a slight local increase in brake pipe pressure over expansion reservoir pressure to shift against resistance of said spring to a position in which said caged spring means is effectively contacted but not compressed for permitting flow through said one communication and responsive to a consequent further local increase in brake pipe pressure to shift against resistance of said spring and caged spring means to a position for closing said one communication and permitting fluid under pressure to be supplied from the supply reservoir to the brake pipe solely via said other communication.

12. The combination according to claim 11, including flow restricting means having a flow capacity substantially greater than that of said other communication, and means responsive to an increase in brake pipe pressure over expansion reservoir pressure to permit flow of fluid under pressure from the control reservoir to the expansion reservoir via and at the rate controlled by said flow restricting means, said valve device being responsive to a consequent increase in expansion reservoir pressure to move to its said one position.

13. In a fluid pressure brake apparatus, the combination of a normally charged brake pipe in which fluid pressure is decreased and increased for respectively causing an application and a release of brakes, an expansion reservoir, a control reservoir containing fluid at substantially the normal charge value of brake pipe pressure, a supply reservoir normally charged with fluid under pressure, a brake cylinder, service valve means controlled by control reservoir pressure opposing expansion reservoir pressure and brake cylinder pressure and operative to supply fluid from the supply reservoir to the brake cylinder at a pressure substantially proportionate to the degree of reduction in expansion reservoir pressure below control reservoir pressure and operative to release brake cylinder pressure to a degree corresponding to the extent of reduction in differential between control reservoir pressure and expansion reservoir pressure, valve means normally establishing a connection through which fluid under pressure may flow between the brake pipe and expansion reservoir and responsive to a brake cylinder pressure in excess of a preselected value to disestablish such connection, means for permitting restricted flow of fluid from the expansion reservoir into the brake pipe in bypass of said connection during a reduction in brake pipe pressure and preventing such bypassing flow in the reverse direction, means defining a communication through which fluid under pressure can flow from the supply reservoir to a chamber, a movable abutment, a valve element carried by and extending coaxially through said movable abutment, said valve element having a passage for controlling connection of said chamber with the brake pipe, a valve arranged coaxially with said valve element and operative when in contact with said valve element to establish a restricted flow connection between said chamber and passage, said valve being normally biased out of contact with said valve element for establishing an unrestricted flow connection between said passage and said chamber in bypass of said restricted flow connection, a spring, caged spring means normally ineffective to exert any bias on said movable abutment, said movable abutment being subject to brake pipe pressure acting in opposition to expansion reservoir pressure and pressure of said spring and also to pressure of said caged spring means when the latter is effective and normally biased by said spring to a normal position for sealing off the other end of said passage from the brake pipe, said movable abutment being responsive to a slight increase in brake pipe pressure over expansion reservoir pressure to move against resistance of said spring to one position in which said caged spring means is effectively contacted but not compressed for thereby causing fluid under pressure to be backdumped from the supply reservoir locally into the brake pipe via said chamber and passage in bypass of said restricted flow connection, said movable abutment being responsive to the consequent local increase in brake pipe pressure to shift against the combined resistance of said spring and said caged spring means for carrying said valve element into contact with said valve for closing said unrestricted flow connection and causing further supply of supply reservoir air to the brake pipe to be effected solely via and at the restricted rate controlled by said restricted flow connection.

14. In a fluid pressure brake apparatus, the combination of a normally charged brake pipe in which fluid pressure is decreased and increased for respectively causing an application and a release of brakes, an expansion reservoir, a control reservoir, a supply reservoir, a brake cylinder, service valve means controlled by control reservoir pressure, opposing expansion reservoir pressure and brake cylinder pressure and operative to supply fluid from the supply reservoir to the brake cylinder at a pressure substantially proportionate to the degree of reduction in expansion reservoir pressure below control reservoir pressure and operative to release brake cylinder pressure to a degree corresponding to the extent of reduction in differential between control reservoir pressure and expansion reservoir pressure, valve means normally establishing a connection through which fluid under pressure may flow between the brake pipe and expansion reservoir and responsive to a brake cylinder pressure in excess of a preselected value to disestablish such connection, means defining a communication of lesser flow capacity than said flow connection for permitting flow of fluid from the expansion reservoir into the brake pipe in bypass of said connection and preventing such bypassing flow in the reverse direction, flow restricting means, a valve for permitting fluid flow from the expansion reservoir to the control reservoir via said flow restricting means for charging the control reservoir, check valve means permitting fluid flow from the brake pipe to a chamber and preventing fluid flow in the reverse direction, valve means normally preventing fluid flow from said chamber to said supply reservoir, means for opening the last-named valve means when control reservoir pressure exceeds supply reservoir pressure such that charging of said supply reservoir, irrespective of its selected capacity, will be controlled according to the rate at which the control reservoir is charged via said flow restricting means, a normally caged spring, a valve device subject to brake pipe pressure acting in opposition to expansion reservoir pressure and a light bias pressure and to the pressure of said spring when uncaged, said valve device normally being biased by said bias pressure to one position in which said spring is caged and flow of fluid under pressure from the supply reservoir to the brake pipe is prevented, said valve device being responsive to a slight increase in brake pipe pressure over expansion reservoir pressure to move against resistance of said bias pressure but not said spring to another position for backdumping fluid under pressure from the supply reservoir into the brake pipe at a substantially unrestricted rate until the consequent increase in brake pipe pressure causes said valve device to move against the combined resistance of said bias pressure and spring to a third position in which such unrestricted rate of backdump is terminated, and means responsive to an increase in brake pipe pressure over expansion reservoir pressure to permit flow of fluid under pressure from said control reservoir to said expansion reservoir for reducing said differential until expansion reservoir pressure has increased to substantially the increased value of brake pipe pressure.

15. In a fluid pressure brake apparatus, the combination of a normally charged brake pipe in which pressure of fluid is decreased and increased for respectively causing a brake application and a release of a brake application, a control reservoir normally charged with fluid at substantially the normal charge value of brake pipe pressure, an expansion reservoir, a brake cylinder, service valve means subject to control reservoir pressure acting in opposition to expansion reservoir pressure and brake cylinder pressure and operative to provide in the brake cylinder fluid at a pressure substantially proportionate to the differential between control reservoir pressure and expansion reservoir pressure, inshot valve means operative to establish and disestablish a substantially unrestricted flow connection between the brake pipe and expansion reservoir according as brake cylinder pressure is less than or exceeds a preselected value, one-way flow means for permitting fluid flow at a restricted rate in bypass of said flow connection and only from the expansion reservoir into the brake pipe such that after closure of said flow connection said differential will increase at said restricted rate and thereby limit the rate of buildup of brake cylinder pressure, and means responsive to a preponderance of brake pipe pressure over expansion reservoir pressure to permit fluid flow from the control reservoir to the expansion reservoir and thereby so reduce said differential as to cause said service valve means to operate to effect a reduction in brake cylinder pressure of a degree corresponding to the extent of such reduction in said differential.

16. In a fluid pressure brake apparatus, the combination of a normally charged brake pipe in which pressure of fluid is decreased and increased for respectively causing a brake application and release of a brake application, a control reservoir normally charged with fluid at substantially the normal charge value of brake pipe pressure, an expansion reservoir, means defining a normally open flow connection permitting fluid flow between the brake pipe and expansion reservoir, a brake cylinder, valve means responsive to brake cylinder pressure in excess of a preselected value to effect closure of said flow connection, means defining a normally closed communication of lesser flow capacity than said flow connection and extending between said expansion reservoir and brake pipe in bypass of said flow connection, means responsive to a preponderance of expansion reservoir pressure over brake pipe pressure to open said communication, a quick service volume, three springs one of which is stronger than the second and third of these springs, and service valve means controlled by control reservoir pressure acting in opposition to expansion reservoir pressure and brake cylinder pressure and normally biased by said one spring to a full release position for concurrently venting the brake cylinder and said quick service volume, said service valve means being responsive to a slight reduction in expansion reservoir pressure below control reservoir pressure to move with the assistance of said second spring against resistance of said one spring to a preliminary quick service position for cutting off said quick service volume from its vent and permitting flow of fluid under pressure from said expansion reservoir to said quick service volume for causing a local quick service reduction in expansion reservoir pressure and in brake pipe pressure, said service valve means being operative responsively to a reduction in expansion reservoir pressure greater than said slight reduction to move against resistance of both said one spring and said third spring to a brake application position for effecting supply of fluid under pressure to the brake cylinder at a relatively fast rate until said flow connection is closed whereupon further supply of fluid under pressure to said brake cylinder will be effected at a slower rate corresponding to the rate at which expansion reservoir pressure can blow down into the brake pipe via said communication.

17. In a fluid pressure brake apparatus of the type wherein pressure of fluid in a brake cylinder is controlled according to the extent pressure of fluid in an expansion reservoir is reduced below the pressure of fluid in a control reservoir normally containing fluid at the normal charge value of fluid pressure in a brake pipe, the combination of casing means providing a chamber open to the brake pipe, a movable valve seat and a fixed valve seat arranged coaxially in said chamber, an inshot valve contained in said chamber and seatable selectively or concurrently against either or both of said valve seats, said inshot valve being subject to brake pipe pressure in said chamber opposing expansion reservoir pressure and a spring bias pressure, said inshot valve having a restriction therethrough for providing a restricted flow communication between the chamber and expansion reservoir when the inshot valve is disengaged from the movable valve seat, said inshot valve normally being biased by said spring bias pressure into sealing contact with the movable valve seat and out of contact with said fixed valve seat for respectively closing said restricted flow communication and opening a substantially unrestricted flow communication between the chamber and expansion reservoir in bypass of said restriction, means providing a flow path via which fluid under pressure may flow at a restricted rate in bypass of said communications only from the expansion reservoir to the brake pipe to permit expansion reservoir to reduce to substantially the same degree as brake pipe pressure, a movable abutment reciprocable in the casing means and operatively connected to said movable valve seat and responsive to a brake cylinder pressure in excess of a preselected value to shift said inshot valve through its contact with said movable valve seat into contact with said fixed valve seat for concurrently closing said communications, valve means responsive to an increase in brake pipe pressure over expansion reservoir pressure to effect a reduction in control reservoir pressure for causing a reduction in brake cylinder pressure, said movable abutment being responsive to a reduction in brake cylinder pressure to below said preselected value to withdraw said movable valve seat from sealing contact with said inshot valve for opening said restricted flow communication, whereupon said inshot valve initially will be maintained in contact with said fixed valve seat by preponderant effect of brake pipe pressure in said chamber for deferring reopening of said unrestricted flow communication until expansion reservoir pressure has increased to within a chosen degree of brake pipe pressure as determined by the bais effect of said spring bias pressure.

18. The combination according to claim 17, including means providing a lost motion connection between said movable valve seat and movable abutment, and a bias spring of greater bias effect than said spring bias pressure for biasing said movable valve seat toward said inshot valve to one limit position, whereby when said movable abutment is moved a limited extent into contact with a stop in the casing means responsively to a brake cylinder pressure exceeding said preselected value, said inshot valve will be held in concurrent contact with both of said valve seats by a nominal spring force corresponding to the differential in bias effects of said bias spring and spring bias pressure.

19. In a fluid pressure brake apparatus, the combination of a normally charged brake pipe in which pressure of fluid is decreased and increased for respectively causing a brake application and release of a brake application, a control reservoir normally charged with fluid at substantially the normal charge value of brake pipe pressure, an expansion reservoir, means defining a normally open flow connection permitting fluid flow between the brake pipe and expansion reservoir, a brake cylinder, valve means responsive to brake cylinder pressure in excess of a preselected value to effect closure of said flow connection, means defining a normally closed communication of lesser flow capacity than said flow connection and extending between said expansion reservoir and brake pipe in bypass of said flow connection, means responsive to a preponderance of expansion reservoir pressure over brake pipe pressure to open said communication, and a service valve device comprising bias means, a plurality of movable abutments arranged in a stack, said stack being subject to control reservoir pressure acting in opposition to expansion reservoir pressure and brake cylinder pressure and pressure of said bias means, a brake cylinder release valve carried by said stack for controlling connection of the brake cylinder with atmosphere, a quick service volume, a quick service volume vent valve spring-biased to a closed position for cutting off said volume from a vent, a quick service valve carried by said stack for controlling connection of the expansion reservoir with said volume, a brake cylinder supply valve spring-biased to a closed position for preventing flow of pressure fluid to the brake cylinder, said supply valve and vent valve being arranged coaxially with said stack so as to be selectively openable thereby, said stack being biased by said bias means to a full release position in which said supply valve is closed by its spring bias and said release valve is open and said quick service valve is closed and said stack operatively holds said vent valve open against resistance of its spring bias for venting the quick service volume, said stack being responsive to a slight reduction in expansion reservoir pressure below control reservoir pressure to move against resistance of said bias means to a preliminary quick service position in which said vent valve is closed by its spring bias and said quick service valve is opened for causing a local quick service reduction in expansion reservoir pressure and in brake pipe pressure and said release valve is closed, said stack being responsive to a consequent further reduction in expansion reservoir pressure to move against resistance of said bias means and the spring bias of said brake cylinder supply valve to a brake application position for opening said brake cylinder supply valve to effect supply of pressure fluid to the brake cylinder at a relatively fast rate until said flow connection is closed, whereupon further supply of pressure fluid to the brake cylinder via said brake cylinder supply valve will be effected at a slower rate corresponding to the rate at which expansion reservoir pressure can blow down into the brake pipe via said communication.

No references cited.